US012783255B2

(12) United States Patent
Luo et al.

(10) Patent No.: US 12,783,255 B2
(45) Date of Patent: Nov. 3, 2026

(54) ACCELERATOR USAGE PREDICTION FOR IMPROVED ACCELERATOR READINESS

(71) Applicant: Intel Corporation, Santa Clara, CA (US)

(72) Inventors: Yuzhang Luo, Shanghai (CN); Haoxiang Sun, Shanghai (CN); Siming Wan, Shanghai (CN); Laurent Coquerel, Limerick (IE); John J. Browne, Limerick (IE); Chris MacNamara, Limerick (IE); Fei Z. Wang, Shannon (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/095,998

(22) Filed: Jan. 11, 2023

(65) Prior Publication Data

US 2023/0153121 A1 May 18, 2023

(30) Foreign Application Priority Data

Dec. 6, 2022 (WO) ................ PCT/CN2022/136848

(51) Int. Cl.

| | |
|---|---|
| ***G06F 1/24*** | (2006.01) |
| ***G06F 9/445*** | (2018.01) |
| ***G06F 11/34*** | (2006.01) |
| *G06F 9/4401* | (2018.01) |

(52) U.S. Cl.

CPC ...... *G06F 9/44505* (2013.01); *G06F 11/3409* (2013.01); *G06F 9/4411* (2013.01)

(58) Field of Classification Search

CPC ............. G06F 9/44505; G06F 11/3409; G06F 2009/45579; G06F 9/45558; G06F 9/4418

USPC .......................................................... 713/100

See application file for complete search history.

(56) References Cited

U.S. PATENT DOCUMENTS

| | | | | |
|---|---|---|---|---|
| 9,787,332 | B2 | 10/2017 | Guilford et al. | |
| 10,089,264 | B2 * | 10/2018 | Chew | G06F 9/54 |
| 2011/0131430 | A1 * | 6/2011 | Krishnamurthy | G06F 9/5094 713/320 |
| 2011/0157191 | A1 * | 6/2011 | Huang | G06F 1/3203 345/503 |
| 2011/0161955 | A1 * | 6/2011 | Woller | G06F 9/45545 718/1 |
| 2011/0173593 | A1 * | 7/2011 | Arimilli | G06F 8/4441 717/140 |
| 2011/0191610 | A1 * | 8/2011 | Agarwal | G06F 1/3203 713/310 |

(Continued)

FOREIGN PATENT DOCUMENTS

WO 2021196065 A1 10/2021

*Primary Examiner* — Volvick Derose

(74) *Attorney, Agent, or Firm* — Compass IP Law PC

(57) ABSTRACT

A machine-readable storage medium having program code that when processed by one or more processing cores causes a method to be performed. The method includes determining from program code that is scheduled for execution and/or is being scheduled for execution that an accelerator is expected to be invoked by the program code. The program code to implement one or more application software processes. The method also includes, in response to the determining, causing the accelerator to wake up from a sleep state before the accelerator is first invoked from the program code's execution.

19 Claims, 8 Drawing Sheets

(56) References Cited

U.S. PATENT DOCUMENTS

| | | | | |
|---|---|---|---|---|
| 2014/0189317 | A1* | 7/2014 | Ben-Kiki | G06F 15/80 712/220 |
| 2015/0089495 | A1* | 3/2015 | Persson | G06F 9/45558 718/1 |
| 2015/0317161 | A1* | 11/2015 | Murphy | G06F 9/461 712/228 |
| 2016/0210167 | A1* | 7/2016 | Bolic | G06F 9/45558 |
| 2018/0089881 | A1* | 3/2018 | Johnson | G06F 9/45558 |
| 2019/0094946 | A1* | 3/2019 | Pillilli | G06F 1/28 |
| 2019/0215769 | A1* | 7/2019 | Samson | G06F 1/324 |
| 2020/0073713 | A1* | 3/2020 | Nield | G06F 9/4881 |
| 2020/0358685 | A1* | 11/2020 | Gupta | G06F 1/3206 |
| 2020/0359265 | A1* | 11/2020 | Azizi | H04W 28/0908 |
| 2021/0026651 | A1* | 1/2021 | Bachmutsky | G06F 9/485 |
| 2022/0391110 | A1 | 12/2022 | Wang et al. | |
| 2023/0118662 | A1* | 4/2023 | Hu | G06F 9/4405 718/102 |
| 2024/0333541 | A1* | 10/2024 | Fujimoto | H04L 12/12 |

* cited by examiner

ACCELERATOR USAGE PREDICTION FOR IMPROVED ACCELERATOR READINESS

RELATED APPLICATIONS

This application claims the benefit of priority to Patent Cooperation Treaty (PCT) Application No. PCT/CN2022/136848 filed Dec. 6, 2022. The entire content of that application is incorporated by reference.

BACKGROUND OF THE INVENTION

High performance data centers rely on various numerically intensive computations to perform the data center's various functions. System engineers are therefore examining ways to more efficiently utilize the acceleration hardware that performs these computations.

DETAILED DESCRIPTION

Figure 1:
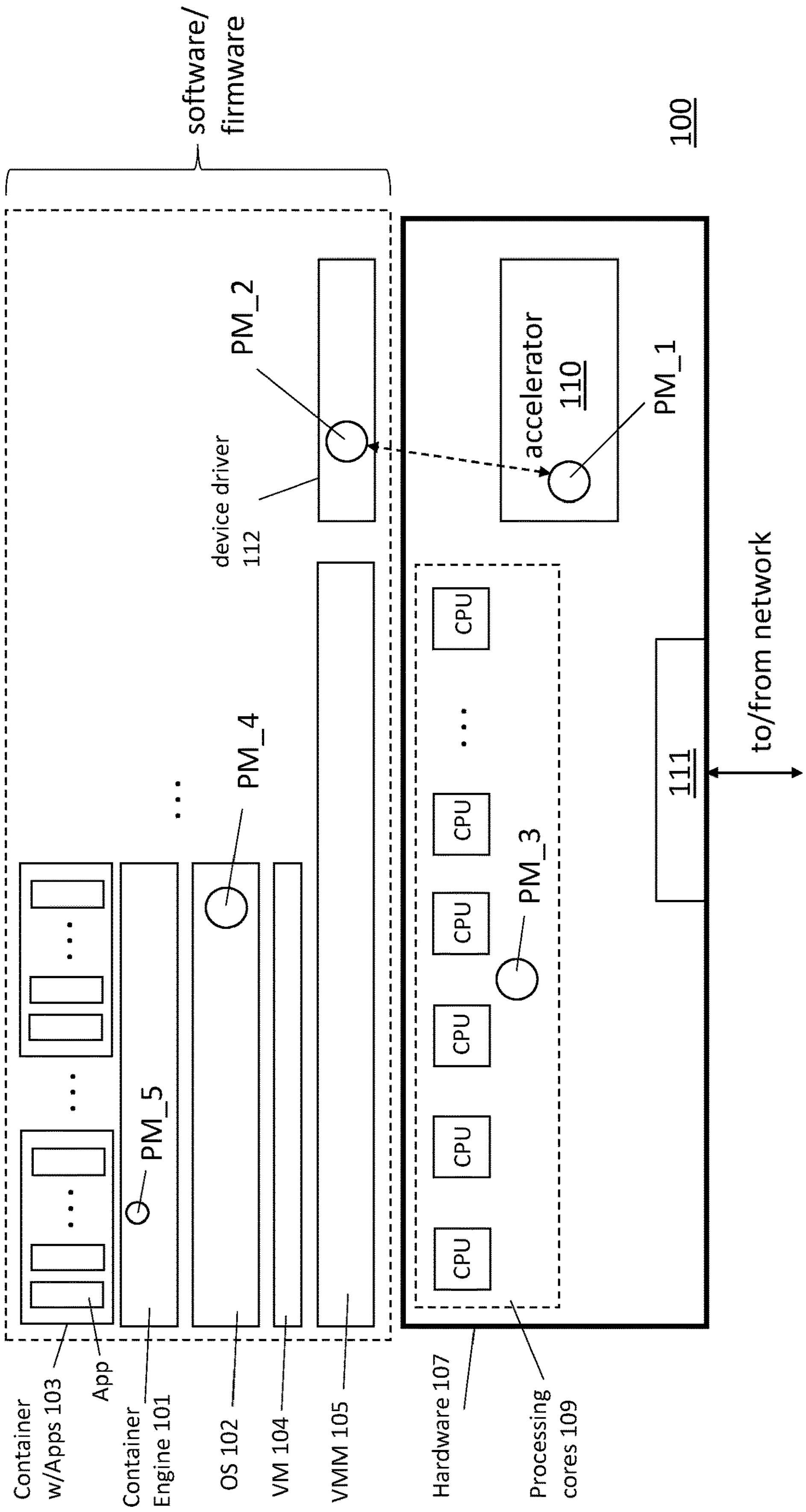
FIG. 1 depicts a containerized software environment.

FIG. 1 depicts a containerized application software environment 100 (such as a Kubernetes environment). As observed in FIG. 1, a container engine executes 101 on an operating system (OS) instance 102. The container engine 101 provides "OS level virtualization" for multiple containers 103 that execute on the container engine 101 (for ease of drawing only one container is labeled with a reference number).

A container 103 generally defines the execution environment of the application software programs that execute "within" the container (the application software programs may be micro-services application software programs). For example, a container's application software programs execute as if they were executing upon a same OS instance and therefore are processed according to a common set of OS/system-level configuration settings, variable states, execution states, etc.

The container's underlying operating system instance 102 executes on a virtual machine (VM) 104. A virtual machine monitor 105 (also referred to as a "hypervisor") supports the execution of multiple VMs which, in turn, each support their own OS instance and corresponding container engine and containers.

The above described software is physically executed in hardware 107 on the CPU cores 109 of, e.g., a multi-core processor semiconductor chip. The cores 109 are capable of concurrently executing a plurality of threads, where, a thread is typically viewed as a stream of program code instructions. The different software programs often correspond to different "processes" to which one or more threads can be allocated.

The hardware 109 also includes dedicated accelerator circuitry 110 which can be integrated into the same processor as the CPU cores 109 to offload certain intensive computations from the CPU cores 109 (alternatively, the accelerator 110 can be integrated on another semiconductor chip or module that plugs into a larger computer system). Here, rather than have such computations be performed in software, they are instead performed in hardware by the accelerator 109 to, e.g., reduce computation time and/or power consumption per computation. Examples of such computations include artificial intelligence related computations (e.g., neural network processing, machine learning, inference engine processing, etc.), image processing related computations (e.g., encoding, decoding), security related computations (e.g., encryption, decryption, etc.).

In other or combined implementations, the accelerator 110 is a component of an infrastructure processing unit (IPU) that is architecturally closer to the hardware's I/O or periphery and is used to accelerate computationally intensive I/O tasks. For example, the accelerator 110 can be coupled closer to the hardware's networking interface 111 and perform intensive networking tasks, such as encryption of outgoing (e.g., IPsec) packets and/or decryption of incoming (e.g., IPsec) packets. Another example is an accelerator that is coupled closer to the hardware's non-volatile storage and performs encryption/decryption and/or compression/decompression of data that is written/read to/from non-volatile mass storage.

Depending on the specific implementation, one or more accelerators 110 can be integrated on the same processor chip as the cores 109, and/or, if the hardware 109 corresponds to a larger system or rack, one or more accelerators 110 can be part of a separate module that plugs into the larger system or rack.

The accelerator 110 typically has its own dedicated device driver software 112 to help configure the accelerator 110 and manage the accelerator 110 at a high level during runtime, including, managing the accelerator's power consumption.

Precisely managing an accelerator's power consumption can be an important component of an overall performance/power profile of the system 100 of FIG. 1. For example, in the case where the accelerator 110 is to off load computationally intensive computations from the CPU cores 109, during nominal runtime, the accelerator 110 is not invoked until one of the software programs needs to perform a computation supported by the accelerator 110.

Here, a program will typically suspend its operation and send a request to the accelerator 110 with the applicable input data (and/or a reference thereto). The accelerator 110, in response, performs the requested computation and provides the result to the requesting software program. The program then returns to execution from its suspended state. By contrast, in the case where the accelerator 110 is performing in-line I/O tasks, the accelerator 110 is mainly used when the hardware 107 is sending/receiving I/O traffic.

Ideally, the accelerator 110 is consuming significant power only when it is needed and performing a computation, whereas, when the accelerator 110 is not performing a computation, it should be consuming little/no power.

The accelerator 110 is typically designed to have a number of power states where each next, lower power state corresponds to a deeper level of sleep, lower power consumption and longer wake-up time. At a highest power state, the accelerator 110 is operational (is not asleep) and supports various performance states where each next, higher power state corresponds to higher accelerator performance and power consumption.

As observed in FIG. 1 there are five points of power management that can affect the power state and/or performance state of an accelerator 100. These are: 1) the accelerator's internal power management hardware circuit (PM_1); 2) a power management function (PM_2) within the accelerator's device driver 112; 3) one or more power managers (PM_3) for the hardware 107 (which can include, e.g., the power manager of a multi-core processor, and/or the power manager of a larger computer system, etc.); and, 4) various, e.g., user configured, power management settings in the operating system instances (PM_4) and/or virtualized operating system instances (PM_5) of the system's software.

Unfortunately, the accelerator's dedicated power management functions PM_1, PM_2 are largely reactive and cannot predict when the accelerator will be needed. For example, in the case where the accelerator 110 offloads computation tasks from the CPU cores 109, the accelerator's power management functions PM_1, PM_2 cannot predict when the software will next request/invoke the accelerator 110. By contrast, in the case where the accelerator 110 performs in-line I/O computations, the accelerator's power management functions PM_1, PM_2 cannot predict when a next "burst" of I/O traffic (such as a burst of outgoing or incoming network packets) will occur.

As such, the accelerator's dedicated power management functions PM_1, PM_2 are designed to do little more than place the accelerator 110 deeper into sleep as the elapsed time since the completion of its last computation grows.

By contrast, the other power management functions PM_3, PM_4, PM_5 are higher level functions that affect the accelerator's performance and/or power state only from wider scale, system level observations and configuration settings (e.g., actual processor/system power consumption vs. a pre-configured processor/system power consumption envelope setting).

In essence, there is little/no "coupling" between the acceleration needs of the executing software, and/or the I/O traffic, and the power management of the accelerator 110. As such, it is not uncommon for the accelerator 110 to be in a deep sleep state when a software process suddenly invokes the accelerator 110 for a needed computation, or, a burst of incoming packets suddenly arrive to the hardware 107. The accelerator 110, being in a deep sleep state, consumes a significant amount of time waking up in response to the event, which, in turn extends the suspended wait time of the invoking software, and/or queuing time of the I/O traffic, thereby diminishing the performance advantage of the accelerator 110.

Likewise, if for an extended runtime into the future the software will have no need for acceleration, and/or no I/O traffic will be present, the accelerator 110 will nevertheless remain in a higher power state until, e.g., a lengthy timer expires that triggers the accelerator 110 into a lower power state. While the timer is counting, the accelerator 110 can be needlessly expending significant amounts of power even though it is not performing any computations.

Figure 2:
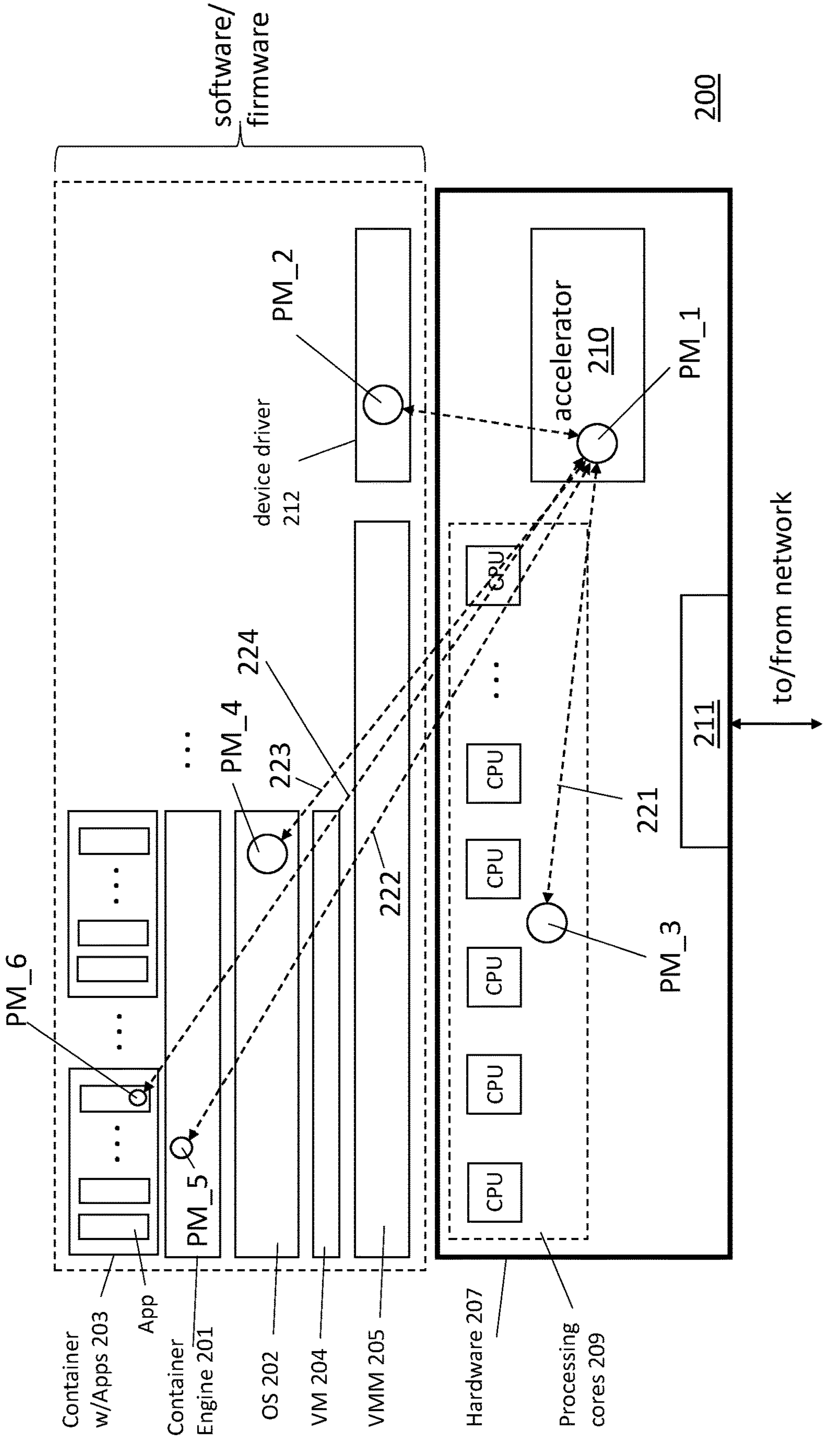
FIG. 2 depicts an improved containerized software environment that anticipates accelerator usage.

A solution, as observed in FIG. 2, is to introduce much tighter coupling 221-224 between the various power management points PM_3, PM_4, PM_5, PM_6 that reside beyond the accelerator's immediate power management points PM_1, PM_2, including at the application software level (PM_6). For ease of drawing, FIG. 2 only depicts tighter coupling 221-224 between these points and the accelerator's internal power manager PM_1. Similar/corresponding couplings can also exist between the external power management points PM_3-PM_6 and the device driver's power manager PM_2.

Here, one or more of these external power management points PM_3-PM_6, being closer to the software and/or I/O flows, can predict that the accelerator 210 will soon be utilized and wake-up the accelerator 210 shortly before it is asked to perform a next computation. Ideally, the time between when the accelerator is woken and when the accelerator 210 begins to perform its next computation approximately corresponds to the (e.g., lengthy) amount of time consumed by the accelerator while it is waking-up (e.g., milliseconds).

Figure 3:
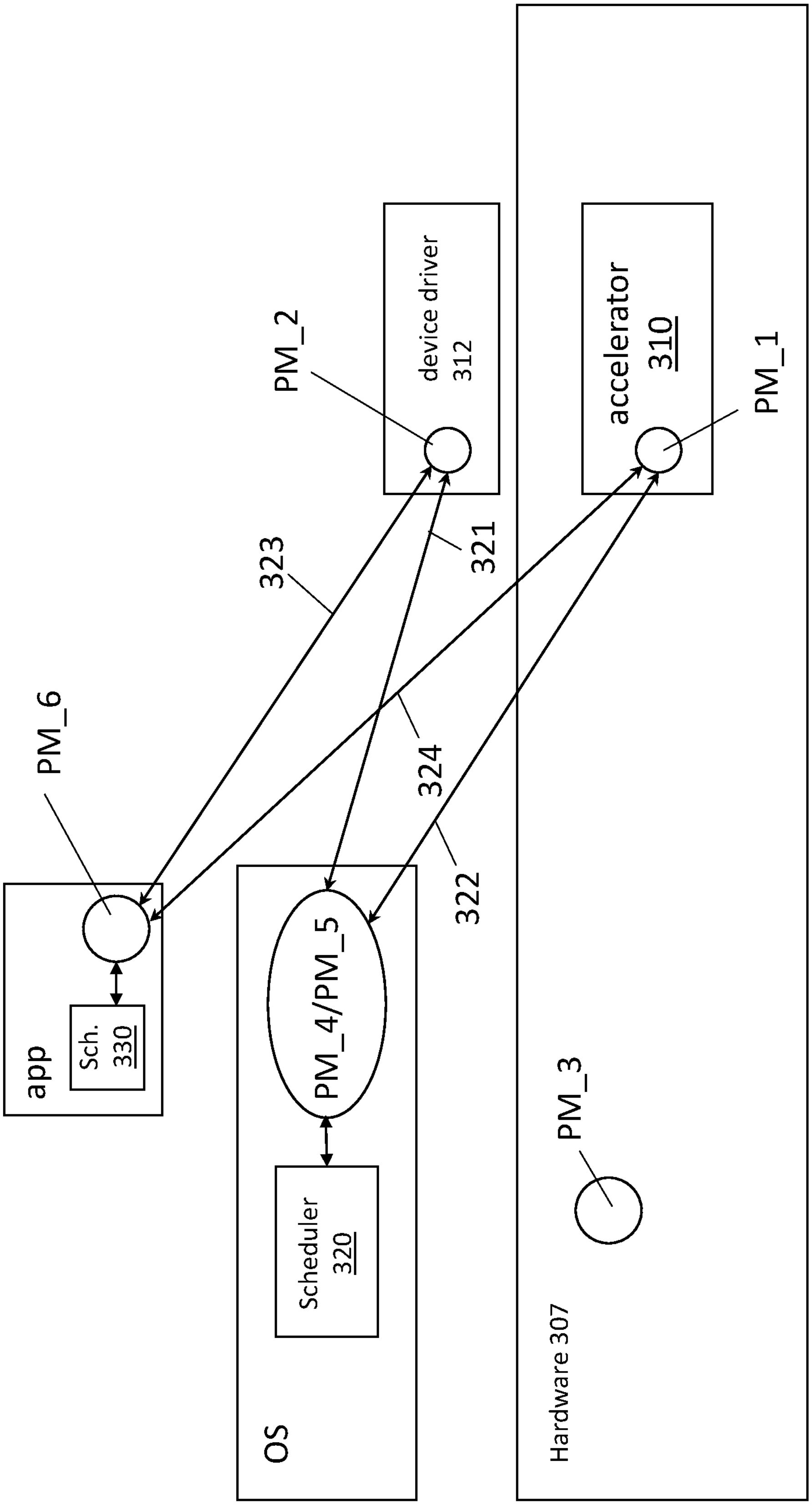
FIG. 3 depicts another improved containerized software environment that anticipates accelerator usage.

According to a dynamic approach, observed in FIG. 3, the OS software power managers PM_4, PM_5 are communicatively coupled with a scheduler 320 within the OS that schedules the respective program code execution of the different processes that execute at or above the OS. For example, referring back to FIG. 2, PM_4 schedules the different processes of the operating system 202, the container engine 201, the various virtual OS instances offered by the container engine 201 and the containers 203 and respective applications that execute on these virtual OS instances.

By contrast, PM_5 is communicatively coupled with a scheduler that is part of the virtual OS instance offered by the container engine 201 that schedules the different applications that execute within the container 203 that runs on the virtual OS instance. Alternatively, or in combination, the scheduler is part of the container 201 and schedules the different processes of the container engine 201 and any of the container's various virtual OS instances, containers and applications. Further still, PM_6 is communicatively coupled with a scheduler 330 that schedules the processes associated with a particular application.

During runtime, the schedulers 320, 330 are aware of the current workload of their respective processes. At any given time, some of these processes may be idle while others may be fully active. Generally, thresholds or other criteria can be configured and/or built into one or more of the power managers PM_4, PM_5, PM_6 that cause communication to one or more of the accelerator's power managers PM_1, PM_2 based on a particular observed scheduler state.

For example, if a scheduler 320, 330 observes little or no workload amongst the processes it supports (from the program code it has just scheduled or is in the process of scheduling), the corresponding software power manager (PM_4, PM_5 or PM_6) can communicate the observed state to one or more of the accelerator's power managers PM_1, PM_2. In response, the accelerator 310 can enter a sleep state or deeper sleep state. By contrast, if a scheduler 320, 330 observes heavy workload amongst the processes it supports, the corresponding software power manager (PM_4, PM_5 or PM_6) can communicate the observed state to one or more of the accelerator's power managers PM_1, PM_2. In response, the accelerator can wake out of a sleep state or place itself into a higher performance state depending on the threshold that triggered the communication.

If more than one of the software power managers PM_4, PM_5, PM_6 report to one or more the accelerator's power managers PM_1, PM_2, the one or more of the accelerator's power managers PM_1, PM_2 can determine the appropriate power state or performance state (enter sleep state, enter deeper sleep state, wake from sleep, enter higher performance state) from the software power manager that is reporting the busiest workload amongst the other software power managers.

Here, if any of the software power managers PM_4, PM_5, PM_6 are communicating directly with the accelerator's hardware power manager PM_1, such communication can take place through register space 322, 324 on the hardware semiconductor chip that the accelerator 310 is integrated upon. By contrast, if any of the software power managers PM_4, PM_5, PM_6 are communicating directly with the accelerator's device driver power manager PM_2, such communication can take place through the device driver's API 321, 323.

Importantly, the schedulers 320, 330 can directly observe program code that has not yet executed but is about to be executed. Thus, schedulers 320, 330 have vision into the future runtime state of the hardware which, in turn, can be correlated to a need for acceleration. Here, light workload or heavy workload as observed by a scheduler 320, 330 can mean an amount of program code to be executed (when software is busy it will have large amounts of program code to execute, whereas, when software is not busy it will have small amounts of program code to execute). As such, how much acceleration will be needed can be correlated to how much program code is about to be executed as observed by a scheduler 320, 330.

Notably, the respective workloads of different types of processes can have different correlations to acceleration (processes are characterized as to how dependent that are on acceleration). These differences, in turn, can be reflected in the configuration settings of the particular power manager and/or accelerator power manager.

For example, again referring back to FIG. 2, if the applications within container 203 are themselves numerically intensive (e.g., weather prediction, chemical reaction simulation, image recognition, etc.) and rely heavily on the accelerator 210, a modest workload as observed by a scheduler at the application level (PM_6) or virtual OS instance level (PM_5) can be sufficient to expect imminent usage of the accelerator 210. As such, the configuration settings of PM_5, PM_6 are set with reasonably low workload thresholds for triggering communication to the accelerator's power management PM_1, PM_2.

By contrast if the applications within container 203 are simple business logic applications with little/no need of acceleration, a much higher workload threshold can be established for PM_5, PM_6.

Corresponding thresholds can be established for lower level software, such as an OS instance 202, that take into account the different kinds of processes that the software supports. For example, if OS instance 202 supports mostly simply business logic applications and very few computationally intensive applications, a higher workload threshold can be configured into PM_4 for communicating to the accelerator's power management PM_1, PM_2 (the applications and OS 202 may be busy but they are nevertheless expected to invoke the acceleration).

Additionally, the power manager associated with a scheduler for one or more processes that generate outbound I/O traffic (e.g., PM_4, PM_5, PM_6), such as outbound packets or blocks of data to be stored in non-volatile storage, can be configured to trigger communication with the accelerator's power management PM_1, PM_2 if the scheduler observes only modest workload.

Further correlations/configurations can be established for informing the accelerator's power management PM_1, PM_2 that no need of acceleration is expected (e.g., no workload is observed for computationally intensive processes or modest/typical workload is observed for non-computationally intensive processes).

Depending on implementation, the correlation between anticipated need for acceleration and observed workload for a particular type of process can be programmed into the software power managers PM_4, PM_5, PM_6, the accelerator's power manager PM_1, PM_2, or both.

In alternate or combined approaches, referring again to FIG. 3, the accelerator's device driver PM_2 actively "pings" or polls the scheduler 320, 330 and/or software power managers PM_4, PM_5, PM_6 for their observed scheduler state or workload. For example, the accelerator device driver power manager PM_2 can actively poll the schedulers of any of the OS 202, virtual OS instance(s), or application(s), or their respective power managers PM_4/PM_5/PM_6, to understand their anticipated workloads.

In various embodiments, the configuration setting of any of the power managers can account for user preferences. For example, some users may desire to operate less efficiently in exchange for reducing risk that the accelerator 310 will not be active when needed. In this case, workload threshold configuration settings for waking up the accelerator 310 can be set to a level that is lower than typical.

In further alternate or combined approaches, rather than attempt to determine accelerator need based on correlation and dynamic observation of upcoming workload, the software is compiled to include static hints within its program code that marks when acceleration is needed. For example, an instruction that precedes a branch to an accelerator invocation can include meta data (a hint) that a scheduler (or other software that supports the application) can detect and inform the accelerator's power management PM_1, PM_2 that an acceleration need is imminent.

If there is no need of acceleration for an extended runtime and the accelerator 310 is placed into a deep sleep as a consequence, the sudden appearance of workload at a scheduler 320, 330 with some expectation of a need for acceleration, or a static hint as described above, will cause the accelerator 310 to be woken from its sleep before the program code that actually invokes the accelerator 310 is executed.

Figure 4:
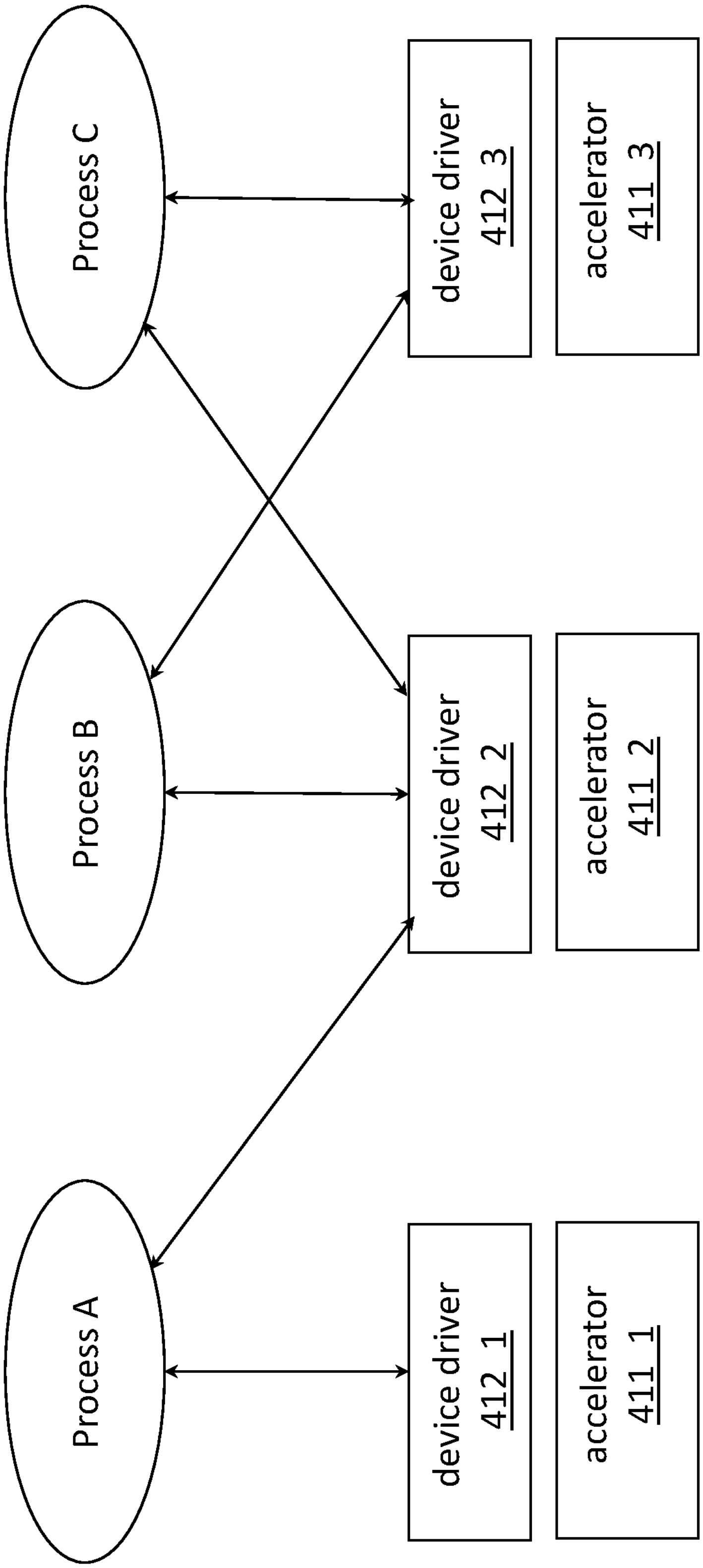
FIG. 4 depicts multiple software processes being mapped across different accelerators.

In further embodiments, referring to FIG. 4, the hardware includes multiple accelerators that are configured to support different processes. Here, as observed in FIG. 4, accelerator 410_1 supports process A, accelerator 410_2 supports processes A, B and C and accelerator 410_3 supports processes B and C. Here, the power state setting for accelerator 410_1 will be based on the accumulated workload observations/hints of process A, while the power state setting for accelerator 410_2 will be based on the accumulated observations/hints of processes A, B and C, and, the power state setting for accelerator 410_3 will be based on the accumulated observations/hints of processes B and C.

The processes can be assigned their own ID and each accelerator's device driver is configured with the process IDs (PIDs) of the processes its accelerator supports so it can ping/poll the processes for a workload status. Here, the device driver 411_1 for accelerator 410_1 is configured with the PID for process A; the device driver 411_2 for accelerator 410_2 is configured with the PID for processes A, B and C; and, the device driver 411_3 for accelerator 410_3 is configured with the PID for processes B and C.

In various implementations the accelerator is allocated to a network endpoint which is assigned memory space that can be shared amongst multiple processes. In this case a process address space ID (PASID) is assigned to the endpoint and the device driver resolves the endpoint's PASID to the PID of the process that the endpoint actually executing within.

A system level hardware power manager PM_3 can also include a scheduler and/or queues of program code yet to be executed and can therefore be configured/designed to perform any of the functions described above for the software power managers PM_4, PM_5, PM_6. Although the software power managers PM_4, PM_5, PM_6 as described above were integrated within OS or application software, they can be integrated into other layers of software such as a virtual machine monitor or virtual machine as these layers can also include schedulers, queues of program code yet to be executed or other structure from which upcoming workload and accelerator need can be determined.

Although embodiment above have emphasized the use of software schedulers (e.g., within an OS instance) that schedule processes to predict the invocation of an accelerator, in other embodiments the prediction can be made partially or entirely in hardware. For example, referring back to FIG. 3, PM_3 can be coupled to any of the instruction queues and/or instruction caches of the CPU cores 207 that, e.g., queue instruction stream threads. Here, hardware can snoop the instruction caches/queues for an instruction operation code (opcode) that corresponds to an accelerator invocation.

Figure 5:
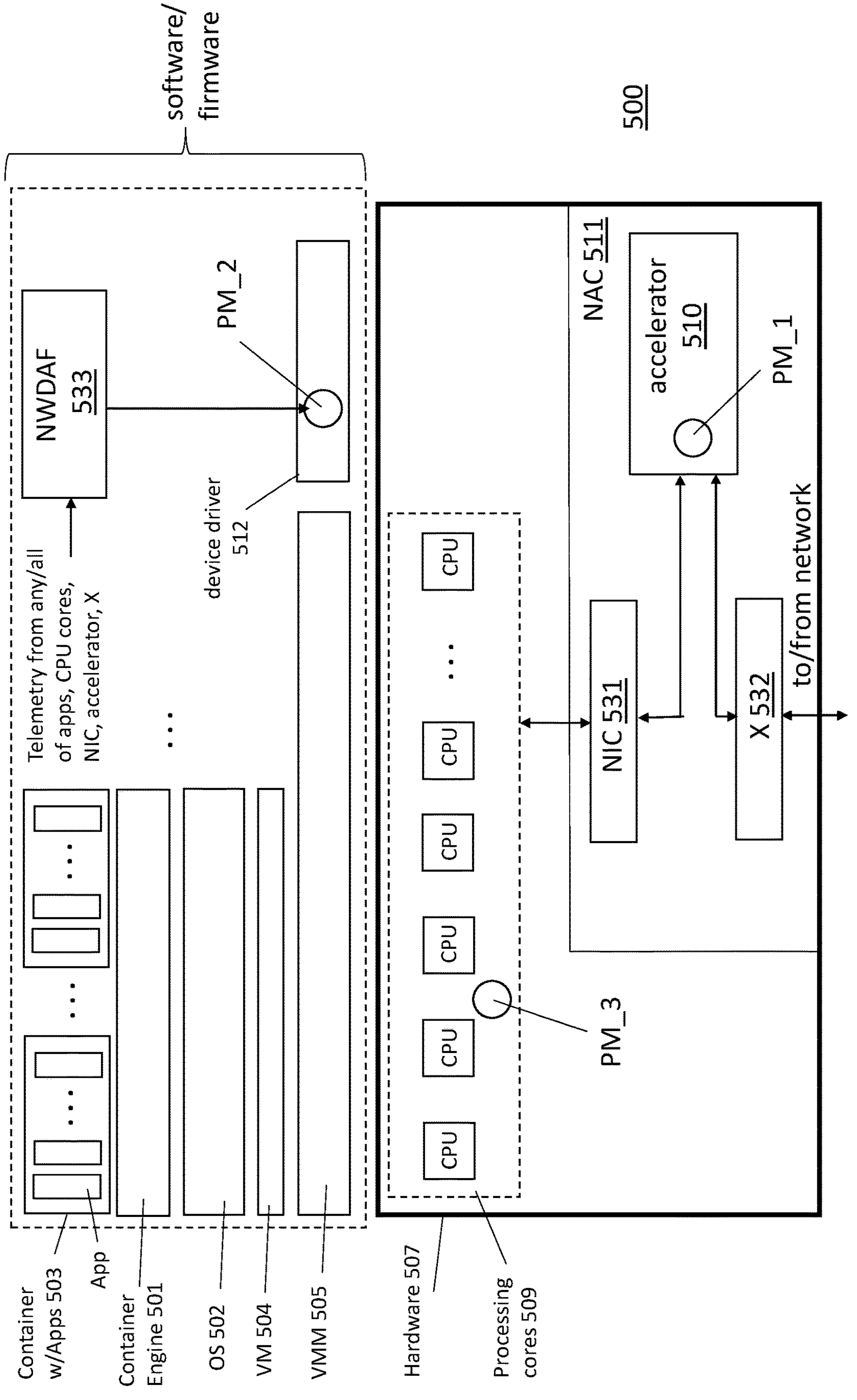
FIG. 5 depicts an improved containerized software environment that uses an NWDAF function to anticipate networking accelerator usage.

FIG. 5 pertains to a networking related implementation, such as a wireless base station for 5G networks and/or an edge computing system. As observed in FIG. 5 the accelerator 510 is integrated in a network acceleration complex (NAC) 511 which, besides the accelerator 510, includes a network interface controller 531 and (optionally) a networking switch 532. The accelerator 510, e.g., implements encryption on egress packets and decryption of ingress packets.

The network interface controller 531 implements queues for ingress streams of packets and egress streams of packets. For example, if the applications within the containers 503 correspond to endpoint functions (the called functions) for a micro-services implementation, the network interface controller 531 can setup a queue for each application. Ingress packets that are directed to a particular application (e.g., function call requests) are placed in that application's ingress queue and egress packets that have been generated by the application (e.g., function call responses) are placed in that application's egress queue.

The above discussions of FIGS. 2 through 4 describe a technique for monitoring the workload of a software process that generates egress traffic so that the accelerator 510 can be woken (if it is in a sleep state), e.g., before the egress packets are placed in an egress queue or at least ready for encryption by the accelerator 510.

However, predicting ingress traffic is more difficult (because it is generated from remote equipment). However, a new technology platform, Network Data Analytics Functionality (NWDAF), is being specified by the 3$^{rd}$ Generation Partnership Project (3GPP) and their family of networking industry standards and specifications for 5G (5G 3GPP). NWDAF is essentially a data analytics tool that collects data from, e.g., 5G network functions, performs network analytics on the data and provides insights into networking operation.

As observed in FIG. 5, an NWDAF application software program 533 is executing on the hardware 507. Here, the NWDAF application 533 can collect data from any/all of the applications 503, the processing cores 509, the network interface controller 531, the accelerator 510 and/or its device driver 512, and the switch 532, e.g., apply machine learning to the collected data, to determine signature patterns in the collected data that correlate to a network state that precedes a burst of ingress packets. Depending on the precise NWDAF application 533 and its design, data from external remote equipment can also be collected and processed to help generate the correlation. In other implementations application software program 533 is a 3GPP Management Data Analytics Services (MDAS) function.

Once the correlation is established, upon detecting the looked for signature from the input sources 503, 509, 531, 510, 532 (and other sources of input data if any), the accelerator 510 is woken if in a sleep state before the sudden surge of ingress packets arrives. Here, power or control management of each of the sources can be programmed with its component of the looked-for signature, and, if observed, report the event to the accelerator's device driver 511 and/or the accelerator 510 itself. If the device driver 511 and/or accelerator 510 concurrently receive all components of the critical signature as determined by the NWDAF application 533 (which a priori were programmed into the device driver 511 by the NWDAF application 533), the accelerator 510 is woken or otherwise placed into the appropriate power and performance state.

As just one example, one or more applications 503 may collect large amounts of data from remote clients. Over time, the NWDAF application 533 will learn that a burst of inbound packets are received at the hardware 507 within a few minutes after a certain type of request is sent by one of these applications. As such, the device driver 512 and/or accelerator 510 are programmed to receive notification of the transmission of such a request and to wake up from a sleep state a few minutes later in anticipation of the expected burst of inbound packets.

In various embodiments the NWDAF application 533 largely (or entirely) monitors a network "slice" in order to anticipate future accelerator need and/or imminent arrival of ingress packets that will be processed by one or more accelerators. Here, a network slice can be the state of a subset of a network including, e.g., the state of a subset of the logical end-to-end connections that exist within a network, the state of a subset of a network's networking equipment (routers, switches, link status, etc.), some combination of these, etc. Thus, in various embodiments the NWDAF application monitors a specific slice of a network and determines future accelerator workload from statistics and/or other telemetry that is collected for the slice (where, e.g., the accelerators process traffic/packets for/within the slice). In various embodiments, network slice information is fed to an NWDAF application by a Management Data Analytic Service (MDAS) (which can be implemented, e.g., as another application software program that is coupled to various network components that correspond to a slice), and/or, an MDAS hardware and/or software function carries out the NWDAF functionality described above. Telemetry information for a network slice can be collected and processed, e.g., for early accelerator wake-up by MDAS and/or NWDAF functionality that is integrated into a gNodeB base station.

Although embodiments above have stressed the ability to predict future accelerator workload for purposes of waking a sleeping accelerator in advance. In alternate or combined embodiments, the same and/or similar principles can be applied to scale the performance and/or power states of an accelerator. For example, anticipated lighter (but not zero) accelerator workload can be used to scale an accelerator's performance state downward to a lower performance state, whereas, anticipated heavy workload can be used to scale an accelerator's workload upward to a higher performance state. Thus, anticipated accelerator workloads can be used to scale an accelerator's performance settings upward/downward depending on high/low workloads rather than just wake a sleeping accelerator from no workload to an expected workload.

In various embodiments, referring to FIGS. 2 and 5, the processing cores 209/509 and the accelerator 210/510. For example, the processing cores 209/509 are implemented on a multi-core processor semiconductor chip and the accelerator is integrated on an infrastructure processing unit that offloads lower level (infrastructure) tasks from the processing cores 209/509 (IPU). In other embodiments the processing cores 209/509 are integrated on a same IPU as the accelerator 210/510.

Referring back to FIGS. 2 and 5, although embodiments above have stressed in various examples that a power management function of the device driver PM_2 "wakes up" the accelerator 210/510, it is pertinent to recognize that the accelerator 210/510 can alternatively or in combination be woken up by hardware power managers PM_1 and/or PM_3, e.g., by designing the power managers PM_1, PM_3 with register space that is written to by the device driver 212 and/or higher level software, and/or by designing the hardware power managers PM_1, PM_3 with configuration register space that establishes the condition in which the accelerator is to be woken-up.

Here, such register space can be programmed, e.g., pre-runtime, to specify the above described "looked for signature". Additional register space can collect real time telemetry/workload information from, e.g., various levels of software. When the telemetry/workload information in the additional register space matches/meets the pre-configured "looked for signature" in the configuration register space, either or both of the hardware power managers PM_1, PM_3 wake the accelerator 210.

Figure 6:
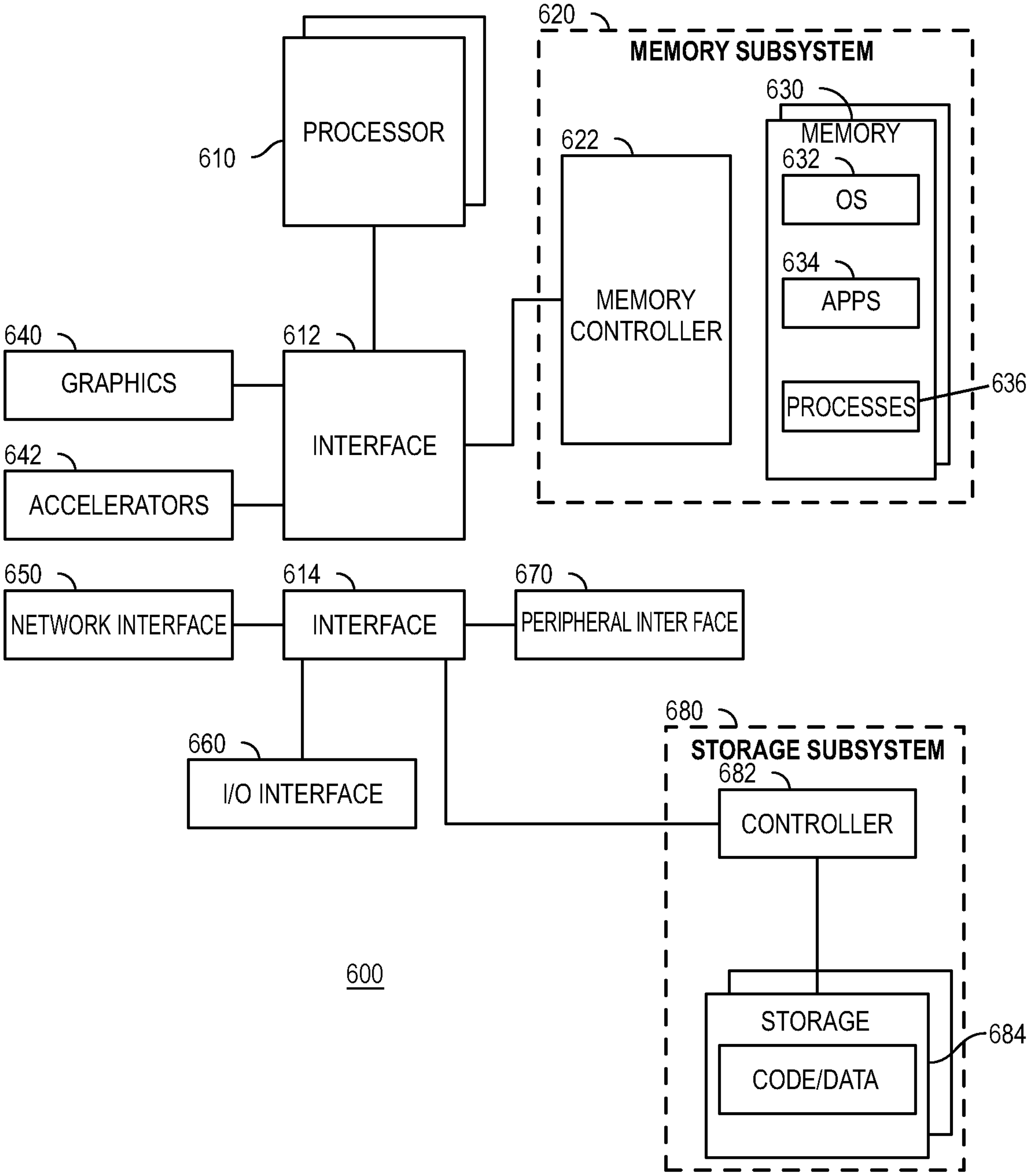
FIG. 6 shows an electronic system.
Figure 7:
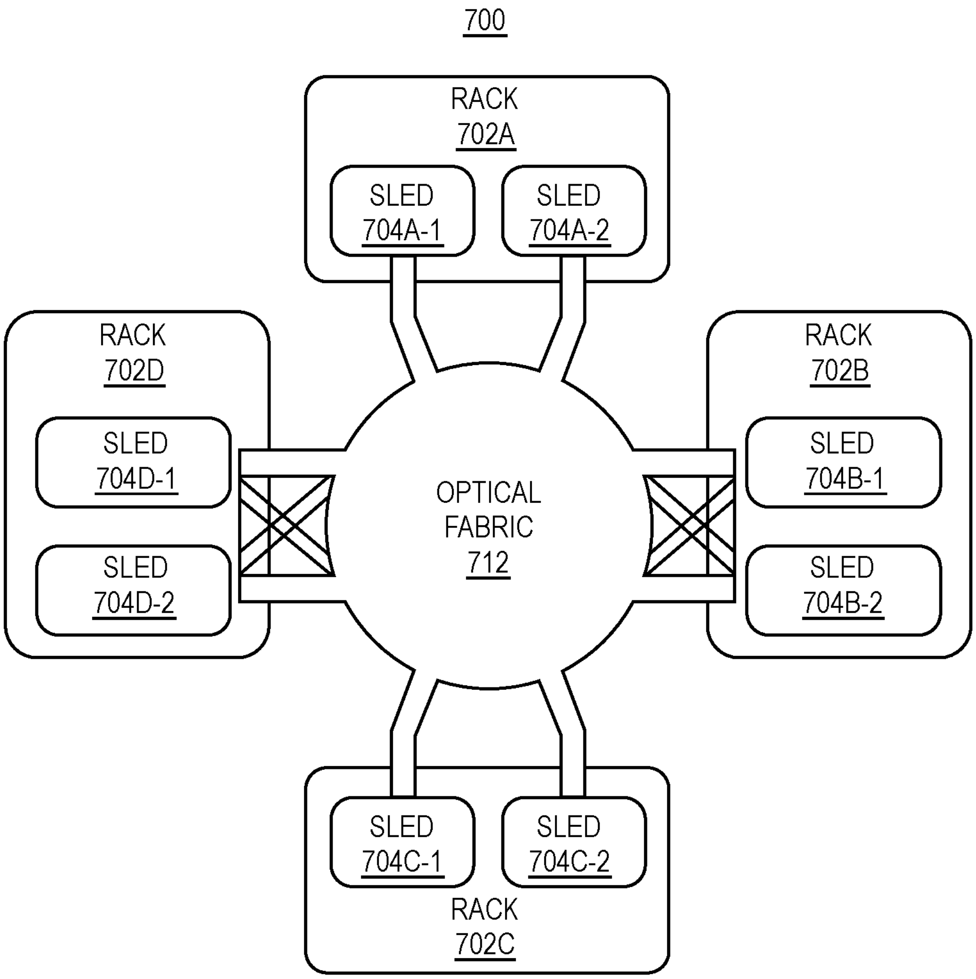
FIG. 7 shows a data center.
Figure 8:
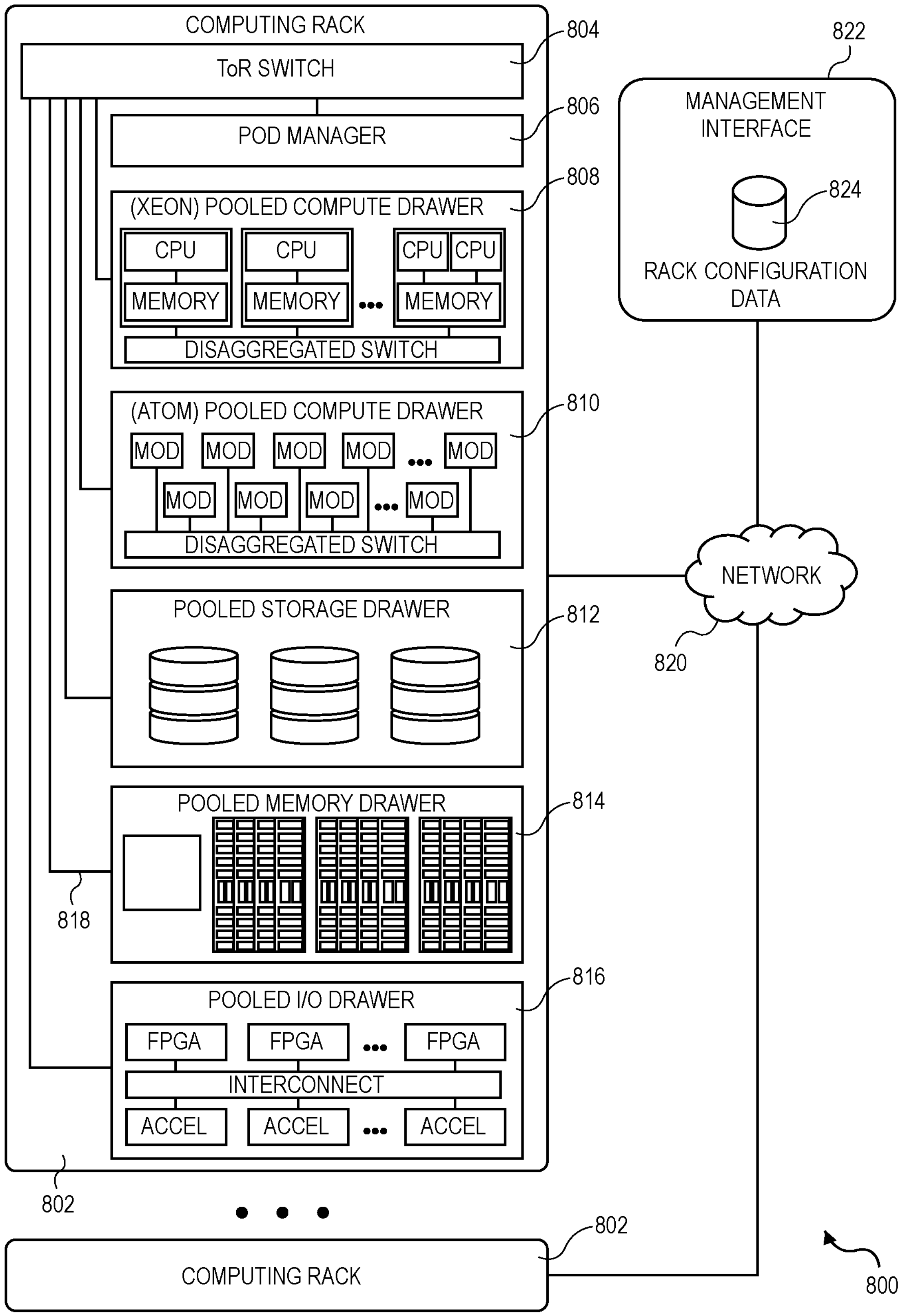
FIG. 8 shows a rack.

The following discussion concerning FIGS. 6, 7, and 8 are directed to systems, data centers and rack implementations, generally. FIG. 6 generally describes possible features of an electronic system that can include technology for predicting imminent accelerator usage as described at length above. FIG. 7 describes possible features of a data center that can include such electronic systems. FIG. 8 describes possible features of a rack having one or more such electronic systems.

FIG. 6 depicts an example system. System 600 includes processor 610, which provides processing, operation management, and execution of instructions for system 600. Processor 610 can include any type of microprocessor, central processing unit (CPU), graphics processing unit (GPU), processing core, or other processing hardware to provide processing for system 600, or a combination of processors. Processor 610 controls the overall operation of system 600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

Certain systems also perform networking functions (e.g., packet header processing functions such as, to name a few, next nodal hop lookup, priority/flow lookup with corresponding queue entry, etc.), as a side function, or, as a point of emphasis (e.g., a networking switch or router). Such systems can include one or more network processors to perform such networking functions (e.g., in a pipelined fashion or otherwise).

In one example, system 600 includes interface 612 coupled to processor 610, which can represent a higher speed interface or a high throughput interface for system components that needs higher bandwidth connections, such as memory subsystem 620 or graphics interface components 640, or accelerators 642. Interface 612 represents an interface circuit, which can be a standalone component or integrated onto a processor die. Where present, graphics interface 640 interfaces to graphics components for providing a visual display to a user of system 600. In one example, graphics interface 640 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 640 generates a display based on data stored in memory 630 or based on operations executed by processor 610 or both. In one example, graphics interface 640 generates a display based on data stored in memory 630 or based on operations executed by processor 610 or both.

Accelerators 642 can be a fixed function offload engine that can be accessed or used by a processor 610. For example, an accelerator among accelerators 642 can provide compression (DC) capability, cryptography services such as public key encryption (PKE), cipher, hash/authentication capabilities, decryption, or other capabilities or services. In some embodiments, in addition or alternatively, an accelerator among accelerators 642 provides field select controller capabilities as described herein. In some cases, accelerators 642 can be integrated into a CPU socket (e.g., a connector to a motherboard or circuit board that includes a CPU and provides an electrical interface with the CPU). For example, accelerators 642 can include a single or multi-core processor, graphics processing unit, logical execution unit single or multi-level cache, functional units usable to independently execute programs or threads, application specific integrated circuits (ASICs), neural network processors (NNPs), "X" processing units (XPUs), programmable control logic circuitry, and programmable processing elements such as field programmable gate arrays (FPGAs). Accelerators 642, processor cores, or graphics processing units can be made available for use by artificial intelligence (AI) or machine learning (ML) models. For example, the AI model can use or include any or a combination of a reinforcement learning scheme, Q-learning scheme, deep-Q learning, or Asynchronous Advantage Actor-Critic (A3C), convolutional neural network, recurrent convolutional neural network, or other AI or ML model. Multiple neural networks, processor cores, or graphics processing units can be made available for use by AI or ML models.

Memory subsystem 620 represents the main memory of system 600 and provides storage for code to be executed by processor 610, or data values to be used in executing a routine. Memory subsystem 620 can include one or more memory devices 630 such as read-only memory (ROM), flash memory, volatile memory, or a combination of such devices. Memory 630 stores and hosts, among other things, operating system (OS) 632 to provide a software platform for execution of instructions in system 600. Additionally, applications 634 can execute on the software platform of OS 632 from memory 630. Applications 634 represent programs that have their own operational logic to perform execution of one or more functions. Processes 636 represent agents or routines that provide auxiliary functions to OS 632 or one or more applications 634 or a combination. OS 632, applications 634, and processes 636 provide software functionality to provide functions for system 600. In one example, memory subsystem 620 includes memory controller 622, which is a memory controller to generate and issue commands to memory 630. It will be understood that memory controller 622 could be a physical part of processor 610 or a physical part of interface 612. For example, memory controller 622 can be an integrated memory controller, integrated onto a circuit with processor 610. In some examples, a system on chip (SOC or SoC) combines into one SoC package one or more of: processors, graphics, memory, memory controller, and Input/Output (I/O) control logic circuitry.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version 3, JESD209-3B, August 2013 by JEDEC), LPDDR4 (LPDDR version 4, JESD209-4, originally published by JEDEC in August 2014), WIO2 (Wide Input/Output version 2, JESD229-2 originally published by JEDEC in August 2014), HBM ((High Bandwidth Memory), JESD235, originally published by JEDEC in October 2013), LPDDR5, HBM2 (HBM version 2), or others or combinations of memory technologies, and technologies based on derivatives or extensions of such specifications.

In various implementations, memory resources can be "pooled". For example, the memory resources of memory modules installed on multiple cards, blades, systems, etc. (e.g., that are inserted into one or more racks) are made available as additional main memory capacity to CPUs and/or servers that need and/or request it. In such implementations, the primary purpose of the cards/blades/systems is to provide such additional main memory capacity. The cards/blades/systems are reachable to the CPUs/servers that use the memory resources through some kind of network infrastructure such as CXL, CAPI, etc.

The memory resources can also be tiered (different access times are attributed to different regions of memory), disaggregated (memory is a separate (e.g., rack pluggable) unit that is accessible to separate (e.g., rack pluggable) CPU units), and/or remote (e.g., memory is accessible over a network).

While not specifically illustrated, it will be understood that system 600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect express (PCIe) bus, a HyperTransport or industry standard architecture (ISA) bus, a small computer system interface (SCSI) bus, Remote Direct Memory Access (RDMA), Internet Small Computer Systems Interface (iSCSI), NVM express (NVMe), Coherent Accelerator Interface (CXL), Coherent Accelerator Processor Interface (CAPI), Cache Coherent Interconnect for Accelerators (CCIX), Open Coherent Accelerator Processor (Open CAPI) or other specification developed by the Gen-z consortium, a universal serial bus (USB), or an Institute of Electrical and Electronics Engineers (IEEE) standard 1394 bus.

In one example, system 600 includes interface 614, which can be coupled to interface 612. In one example, interface 614 represents an interface circuit, which can include standalone components and integrated circuitry. In one example, multiple user interface components or peripheral components, or both, couple to interface 614. Network interface 650 provides system 600 the ability to communicate with remote devices (e.g., servers or other computing devices) over one or more networks. Network interface 650 can include an Ethernet adapter, wireless interconnection components, cellular network interconnection components, USB (universal serial bus), or other wired or wireless standards-based or proprietary interfaces. Network interface 650 can transmit data to a remote device, which can include sending data stored in memory. Network interface 650 can receive data from a remote device, which can include storing received data into memory. Various embodiments can be used in connection with network interface 650, processor 610, and memory subsystem 620.

In one example, system 600 includes one or more input/output (I/O) interface(s) 660. I/O interface 660 can include one or more interface components through which a user interacts with system 600 (e.g., audio, alphanumeric, tactile/touch, or other interfacing). Peripheral interface 670 can include any hardware interface not specifically mentioned above. Peripherals refer generally to devices that connect dependently to system 600. A dependent connection is one where system 600 provides the software platform or hardware platform or both on which operation executes, and with which a user interacts.

In one example, system 600 includes storage subsystem 680 to store data in a nonvolatile manner. In one example, in certain system implementations, at least certain components of storage 680 can overlap with components of memory subsystem 620. Storage subsystem 680 includes storage device(s) 684, which can be or include any conventional medium for storing large amounts of data in a nonvolatile manner, such as one or more magnetic, solid state, or optical based disks, or a combination. Storage 684 holds code or instructions and data in a persistent state (e.g., the value is retained despite interruption of power to system 600). Storage 684 can be generically considered to be a "memory," although memory 630 is typically the executing or operating memory to provide instructions to processor 610. Whereas storage 684 is nonvolatile, memory 630 can include volatile memory (e.g., the value or state of the data is indeterminate if power is interrupted to system 600). In one example, storage subsystem 680 includes controller 682 to interface with storage 684. In one example controller 682 is a physical part of interface 614 or processor 610 or can include circuits in both processor 610 and interface 614.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base, and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 600. More specifically, power source typically interfaces to one or multiple power supplies in system 600 to provide power to the components of system 600. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 600 can be implemented as a disaggregated computing system. For example, the system 600 can be implemented with interconnected compute sleds of processors, memories, storages, network interfaces, and other components. High speed interconnects can be used such as PCIe, Ethernet, or optical interconnects (or a combination thereof). For example, the sleds can be designed according to any specifications promulgated by the Open Compute Project (OCP) or other disaggregated computing effort, which strives to modularize main architectural computer components into rack-pluggable components (e.g., a rack pluggable processing component, a rack pluggable memory component, a rack pluggable storage component, a rack pluggable accelerator component, etc.).

Although a computer is largely described by the above discussion of FIG. 6, other types of systems to which the above described invention can be applied and are also partially or wholly described by FIG. 6 are communication systems such as routers, switches, and base stations.

FIG. 7 depicts an example of a data center. Various embodiments can be used in or with the data center of FIG. 7. As shown in FIG. 7, data center 700 may include an optical fabric 712. Optical fabric 712 may generally include a combination of optical signaling media (such as optical cabling) and optical switching infrastructure via which any particular sled in data center 700 can send signals to (and receive signals from) the other sleds in data center 700. However, optical, wireless, and/or electrical signals can be transmitted using fabric 712. The signaling connectivity that optical fabric 712 provides to any given sled may include connectivity both to other sleds in a same rack and sleds in other racks.

Data center 700 includes four racks 702A to 702D and racks 702A to 702D house respective pairs of sleds 704A-1 and 704A-2, 704B-1 and 704B-2, 704C-1 and 704C-2, and 704D-1 and 704D-2. Thus, in this example, data center 700 includes a total of eight sleds. Optical fabric 712 can provide sled signaling connectivity with one or more of the seven other sleds. For example, via optical fabric 712, sled 704A-1 in rack 702A may possess signaling connectivity with sled 704A-2 in rack 702A, as well as the six other sleds 704B-1, 704B-2, 704C-1, 704C-2, 704D-1, and 704D-2 that are distributed among the other racks 702B, 702C, and 702D of data center 700. The embodiments are not limited to this example. For example, fabric 712 can provide optical and/or electrical signaling.

FIG. 8 depicts an environment 800 that includes multiple computing racks 802, each including a Top of Rack (ToR) switch 804, a pod manager 806, and a plurality of pooled system drawers. Generally, the pooled system drawers may include pooled compute drawers and pooled storage drawers to, e.g., effect a disaggregated computing system. Optionally, the pooled system drawers may also include pooled memory drawers and pooled Input/Output (I/O) drawers. In the illustrated embodiment the pooled system drawers can include an INTEL® XEON® pooled computer drawer 808, and INTEL® ATOM™ pooled compute drawer 810 (or other Intel product), a pooled storage drawer 812, a pooled memory drawer 814, and a pooled I/O drawer 816. Each of the pooled system drawers is connected to ToR switch 804 via a high-speed link 818, such as a 40 Gigabit/second (Gb/s) or 100 Gb/s Ethernet link or an 100+Gb/s Silicon Photonics (SiPh) optical link. In one embodiment high-speed link 818 comprises an 600 Gb/s SiPh optical link.

Again, the drawers can be designed according to any specifications promulgated by the Open Compute Project (OCP) or other disaggregated computing effort, which strives to modularize main architectural computer components into rack-pluggable components (e.g., a rack pluggable processing component, a rack pluggable memory component, a rack pluggable storage component, a rack pluggable accelerator component, etc.).

Multiple of the computing racks 800 may be interconnected via their ToR switches 804 (e.g., to a pod-level switch or data center switch), as illustrated by connections to a network 820. In some embodiments, groups of computing racks 802 are managed as separate pods via pod manager(s) 806. In one embodiment, a single pod manager is used to manage all of the racks in the pod. Alternatively, distributed pod managers may be used for pod management operations. RSD environment 800 further includes a management interface 822 that is used to manage various aspects of the RSD environment. This includes managing rack configuration, with corresponding parameters stored as rack configuration data 824.

Any of the systems, data centers or racks discussed above, apart from being integrated in a typical data center, can also be implemented in other environments such as within a bay station, or other micro-data center, e.g., at the edge of a network.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds, and other design or performance constraints, as desired for a given implementation.

Some examples may be implemented using or as an article of manufacture or at least one computer-readable medium. A computer-readable medium may include a non-transitory storage medium to store program code. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the program code implements various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled, and/or interpreted programming language.

To the extent any of the teachings above can be embodied in a semiconductor chip, a description of a circuit design of the semiconductor chip for eventual targeting toward a semiconductor manufacturing process can take the form of various formats such as a (e.g., VHDL or Verilog) register transfer level (RTL) circuit description, a gate level circuit description, a transistor level circuit description or mask description or various combinations thereof. Such circuit descriptions, sometimes referred to as "IP Cores", are commonly embodied on one or more computer readable storage media (such as one or more CD-ROMs or other type of storage technology) and provided to and/or otherwise processed by and/or for a circuit design synthesis tool and/or mask generation tool. Such circuit descriptions may also be embedded with program code to be processed by a computer that implements the circuit design synthesis tool and/or mask generation tool.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software, and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences may also be performed according to alternative embodiments. Furthermore, additional sequences may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

The invention claimed is:

1. A non-transitory machine-readable storage medium containing program code that when processed by one or more processing cores causes a method to be performed, comprising:

determining from program code that is scheduled for execution for a first subset of multiple software processes on the one or more processing cores and/or is being scheduled for execution that a first accelerator is expected to be invoked by the program code, wherein the first accelerator is configured to support the first subset of the multiple software processes and a second accelerator is configured to support a second subset of the multiple software processes; and in response to the determining, causing the first accelerator to wake up from a sleep state before the first accelerator is first invoked from the program code's execution;

wherein one or more power management points associated with execution of the program code are used to determine when the first accelerator is expected to be invoked by the program code.

2. The non-transitory machine-readable storage medium of claim 1 wherein the method is performed by any one of:

a device driver of the first accelerator;

an operating system instance;

a container engine;

a software application.

3. The non-transitory machine-readable storage medium of claim 2 wherein the method is performed by the device driver of the first accelerator and the method further comprises the device driver polling an instance of an operating system.

4. The non-transitory machine-readable storage medium of claim 1 wherein the determining is performed within an operating system instance and the causing includes the operating system instance sending notification of the determining to a device driver of the first accelerator and/or register space of the first accelerator.

5. The non-transitory machine-readable storage medium of claim 1 wherein the determining is based on an amount of the program code.

6. The machine-readable storage medium of claim 1 wherein the determining is based on the program code being characterized as dependent on acceleration.

7. An apparatus, comprising:

a plurality of processing cores, a first accelerator and a second accelerator;

a virtual machine monitor executing on the plurality of processing cores;

a virtual machine executing on the virtual machine monitor;

an operating system executing on the virtual machine, the operating system to support the concurrent execution of multiple software processes, wherein the first accelerator is configured to support a first subset of the multiple software processes and the second accelerator is configured to support a second subset of the multiple software processes; and an accelerator device driver and/or hardware power manager to wake the first accelerator from a sleep state, before the first accelerator is invoked from the execution of program code for the first subset of the multiple software processes on one or more of the plurality of processing cores, in response to a determination made before the execution of the program code that the program code is expected to invoke the first accelerator;

wherein one or more power management points associated with execution of the program code are used to determine when the first accelerator is expected to be invoked by the program code.

8. The apparatus of claim 7 wherein the first accelerator is an artificial intelligence accelerator.

9. The apparatus of claim 7 wherein the first accelerator is an encryption/decryption accelerator.

10. The apparatus of claim 7 wherein the program code is to send a plurality of egress packets.

11. The apparatus of claim 7 wherein the determination is made by the accelerator device driver and/or hardware power manager.

12. The apparatus of claim 7 wherein the accelerator device driver polls the operating system for a state of the operating system's scheduler.

13. A machine-readable storage medium containing program code that when processed by one or more processing cores causes a method to be performed, comprising:

determining an expected arrival of a burst of ingress packets from based on a signature pattern in collected data that includes networking statistics, the signature pattern to indicate a network state that precedes the burst of ingress packets; and in response to the determining, causing an accelerator to wake up from a sleep state before the accelerator is invoked to process one or more packets from among the burst of ingress packets.

14. The machine-readable storage medium of claim 13 wherein the accelerator performs decryption on the ingress packets.

15. The machine-readable storage medium of claim 14 wherein the collected networking statistics include statistics from a networking interface controller.

16. The machine-readable storage medium of claim 14 wherein the method is performed by a wireless base station.

17. The machine-readable storage medium of claim 13 wherein a Network Data Analytics Functionality function determined from determines the signature pattern based, at least in part, on previously collected networking statistics to indicate the network state that precedes the burst of ingress packets.

18. The machine-readable storage medium of claim 13 wherein the networking statistics are obtained based on monitoring a network slice.

19. The machine-readable storage medium of claim 13 wherein the method further comprises determining an increase or decrease in expected workload of the accelerator from subsequently collected networking statistics and causing the accelerator's performance state to be correspondingly lowered or raised in response.

* * * * *